United States Patent
Lemus et al.

(10) Patent No.: US 10,139,508 B1
(45) Date of Patent: Nov. 27, 2018

(54) METHODS AND APPARATUS FOR AUTOMATIC IDENTIFICATION OF FAULTS ON NOISY SEISMIC DATA

(71) Applicant: EMC IP Holding Company LLC, Hopkinton, MA (US)

(72) Inventors: Noel Moreno Lemus, Rio de Janeiro (BR); Percy E. Rivera Salas, Rio de Janeiro (BR); Angelo E. M. Ciarlini, Rio de Janeiro (BR); Fabio A. M. Porto, Rio de Janeiro (BR); Fábio A. Perosi, Rio de Janeiro (BR)

(73) Assignee: EMC IP Holding Company LLC, Hopkinton, MA (US)

(*) Notice: Subject to any disclaimer, the term of this patent is extended or adjusted under 35 U.S.C. 154(b) by 274 days.

(21) Appl. No.: 15/079,639

(22) Filed: Mar. 24, 2016

(51) Int. Cl.
G01V 1/00 (2006.01)
G01V 1/30 (2006.01)
G01V 1/36 (2006.01)

(52) U.S. Cl.
CPC ............. *G01V 1/301* (2013.01); *G01V 1/364* (2013.01); *G01V 2210/642* (2013.01)

(58) Field of Classification Search
CPC .............................. G01V 1/301; G01V 1/364
USPC ........................................................ 702/16
See application file for complete search history.

(56) References Cited

U.S. PATENT DOCUMENTS

| | | | | |
|---|---|---|---|---|
| 2003/0023383 A1* | 1/2003 | Stark | ........... | G01V 1/28 702/14 |
| 2003/0112704 A1* | 6/2003 | Goff | ........... | G01V 1/30 367/72 |
| 2015/0234067 A1* | 8/2015 | Purves | ........... | G01V 1/30 702/14 |

OTHER PUBLICATIONS

Bahorich et al., "3D seismic discontinuity for faults and stratigraphic features: The coherence cube," Lead. Edge, no., pp. 1053-1058, Oct. 1995.
Viarfurt et al., "Coherency calculations in the presence of structural dip," Geophysics, vol. 64, No. 1, pp. 104-111, 1999.
P. Bakker, "Image structure analysis for seismic interpretation," Delft Univ. Technol., 2002.
Wang et al., "Fault detection in seismic datasets using hough transform," Acount. Speech Signal Process . . . , pp. 2372-2376, 2014.

(Continued)

*Primary Examiner* — Anthony Ho
(74) *Attorney, Agent, or Firm* — Ryan, Mason & Lewis, LLP

(57) ABSTRACT

Methods and apparatus are provided for automatically identifying possible faults in large seismic datasets. An exemplary method comprises obtaining the seismic data; calculating a coherence cube of the seismic data; performing the following steps for a plurality of two-dimensional seismic sections of the coherence cube: (i) applying a threshold to the coherence cube to obtain a binary image representation comprising continuities; (ii) identifying edges of continuity areas in the binary image representation to identify changes in the continuities as fault point candidates; (iii) identifying fault points in the obtained seismic data based on a fault confidence value indicating a likelihood that a given point is part of a fault; (iv) creating one or more fault segments from the identified fault points; and (v) joining fault segments into fault lines using geological and/or geometrical constraints; and generating three-dimensional fault surfaces from the fault lines in the plurality of two-dimensional seismic sections. The exemplary automatic fault detection method can be parallelized.

22 Claims, 8 Drawing Sheets

(56) References Cited

OTHER PUBLICATIONS

Zhao et al., "Automatic fault extraction using a modified ant-colony algorithm," J. Geophys. Eng., vol. 10, No. 2, p. 025009, Apr. 2013.
D. Hale, "Methods to compute fault images, extract fault surfaces, and estimate fault throws from 3D seismic images," Geophysics, vol. 78, No. 2, 2013.
Berndt et al., "Using Dynamic Time Warping to Find Patterns in Time Series," in AAA/94 workshop on knowledge discovery in databases, pp. 359-370, 1994.
Tingdahl et al., "Semi-automatic detection of faults in 3D seismic data," Geophys. Prospect., vol. 53, pp. 533-542, 2005.

\* cited by examiner

```
For each point (x, z) in H(x, z)
{
        if (H(x, z)== 1 and H(x, z+1)== 0)
            D(x, z+1) = 1;
        else if (H(x, z)== 0 and H(x, z+1)== 1)
            D(x, z) = 1;
}
```

500

900

METHODS AND APPARATUS FOR AUTOMATIC IDENTIFICATION OF FAULTS ON NOISY SEISMIC DATA

FIELD

The field relates generally to techniques for processing seismic data to identify faults.

BACKGROUND

Seismic interpretation is a process that aims to investigate the earth subsurface in order to collect relevant information for analysis. The earth subsurface consists of material layers with distinct acoustic impedances, due to the densities of the minerals of rock matrix and porosity characteristics. The interfaces between material layers are called horizons, which are the basic structure for seismic interpretation. Horizons may be analyzed and indicate the existence of several features, such as faults, anticline and monocline folds and salt bodies. Faults are generally sub-vertical fractures across which there is a measurable displacement of rock layers. They are recognized by horizon discontinuities and usually interpreted as straight lines or connected line segments. Faults generally affect fluid mobility in the reservoir. In some cases, they seal the porous reservoir rock by deforming and juxtaposing rock layers and lead to the formation of hydrocarbon reservoirs or allow the hydrocarbon to migrate to a porous rock layer, which will become the reservoir. Therefore, the identification of faults and related structures is very important to recognize potential regions where hydrocarbons can be found.

A seismic dataset comprises numerous closely-spaced seismic traces. Each seismic trace represents a sequence of floating-point values containing the amplitude of the elastic waves reflected by geologic bodies beneath the surface. Each sample of the seismic data is related to the time that the reflected energy in some subsurface structure took to travel the path between the energy source and the receiver (geophone or hydrophone). After some processing, these samples can be presented in depth, rather than time. A seismic dataset can be presented as pre-stack or post-stack data. Pre-stack data corresponds to the raw data, which presents noise and contains the full wave information. Post-stack data, in turn, represents the preprocessed data, with more consolidated data and noise reduction. Despite the noise reduction efforts, it remains extremely difficult to completely eliminate the effect of noise on data, thus the quality of seismic data is rarely very high. This fact directly affects the accuracy of the interpretation results and the reliability of most automatic methods because of the high quality data required. Seismic datasets can be several terabytes in size after processing, implying that it takes longer to build trusted models for reaching exploration decisions.

The fault interpretation procedure, a very important stage of seismic interpretation, is still a very time-consuming and labor-intensive task. Interpreters often need to define a few hundreds, up to several thousands, of points within a seismic dataset in order to track the accurate spatial position of faults. Therefore, a detailed interpretation in a large seismic dataset is almost impossible to perform in a reasonable timeframe.

A need therefore exists for methods and apparatus that automatically or semi-automatically identify seismic fault candidates in large seismic datasets. A further need exists for techniques that identify and rank seismic fault candidates in seismic datasets, even in the presence of noise in the datasets.

SUMMARY

Illustrative embodiments of the present invention provide methods and apparatus for automatically identifying possible faults in large seismic datasets. In one exemplary embodiment, a method for identifying faults in seismic data comprises the steps of obtaining the seismic data; calculating a coherence cube of the seismic data; performing the following steps for a plurality of two-dimensional seismic sections of the coherence cube: (i) applying a threshold to the coherence cube to obtain a binary image representation comprising one or more continuities; (ii) identifying edges of continuity areas in the binary image representation to identify changes in the one or more continuities as fault point candidates; (iii) identifying fault points in the obtained seismic data based on a fault confidence value above a specific threshold, indicating a likelihood that a given point is part of a fault; (iv) creating one or more fault segments from the identified fault points; and (v) joining one or more fault segments into one or more fault lines using one or more of geological and geometrical constraints; and generating one or more three-dimensional fault surfaces from the one or more fault lines in the plurality of two-dimensional seismic sections.

In one or more embodiments, the step of calculating the coherence cube further comprises the steps of computing, for each point in a seismic dataset, a value measuring similarity between one point and a neighborhood window of the one point by partitioning the seismic dataset into a plurality of partitions; replicating a border for each partition to ensure that neighborhood window for each point in each partition is available; assigning each partition to a different compute node in a distributed computing system; and processing the partitions in parallel.

In at least one embodiment, the threshold applied to the coherence cube in order to obtain the binary image representation is determined using an iterative process and wherein the seismic data is partitioned into a plurality of partitions and wherein each partition is assigned to a different compute node in a distributed computing system so that the computation regarding the data of each partition occurs in parallel.

In at least one exemplary embodiment, one or more steps of the automatic fault detection method are parallelized. For example, in a parallel embodiment, the applying step further comprises distributing multiple partitions of the coherence cube and applying the threshold independently and in parallel to the multiple partitions. In addition, in a parallel embodiment, one or more of the steps of identifying edges of continuity areas; identifying fault points; creating one or more fault segments from the identified fault points; removing zero or more false features; and joining one or more fault segments into one or more fault lines further comprise the steps of partitioning the binary image into a plurality of partitions; replicating at least a portion of a border for each partition; assigning each partition to a different compute node in a distributed computing system; and processing each partition in parallel.

In one or more embodiments of an automatic fault detection method, three different fault object types are identified: fault points, fault lines and fault surfaces. Optional confidence values assigned to each detected fault object can guide interpreters towards important regions inside the dataset. A confidence value is optionally assigned to a given fault segment based on the fault confidence value of the fault points in the given fault segment. A confidence value is optionally assigned to a given fault line based on the confidence values of the fault segments in the given fault line. A confidence value is optionally assigned to a given three-dimensional fault surface based on the confidence values of the fault lines in the given fault three-dimensional fault surface.

Advantageously, illustrative embodiments of the invention provide improved techniques for automatically identifying possible faults in seismic datasets. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for automatically identifying possible faults in seismic datasets. While aspects of the present invention are illustrated in the context of the oil-and-gas industry, the present invention applies in any environment where it is desirable to identify faults in seismic data.

One or more embodiments of the invention automatically identify possible faults in large seismic datasets, even in the presence of noise. The disclosed methods are comprised of individual steps one or more of which can be executed by means of embarrassingly parallel algorithms, as discussed further below.

Traditionally, the fault interpretation procedure is accomplished by a technique known as "picking" where several points are selected within a seismic dataset for tracking across a vertical seismic section to detect the fault. In order to help the interpreter in this process, several methods use one or more fault-enhancement attributes to highlight reflector edges and guide the interpreter in the picking process. Although these methods have been automated to some extent, today the fault interpretation process still heavily depends on human interpretation capabilities. The manual interpretation is generally performed on seismic slices and interpreters move across sequences of slices in different directions to evaluate their interpretation therefore requiring several interpretation cycles. These methods have shown good performance, in the presence of high quality data. This is, however, not the standard scenario. In particular, in complex geologies, like those in a pre-salt area, seismic data presents a very low ratio between signal and noise, due to its attenuation in the salt layer, and large data volumes. In this context, the traditional fault interpretation procedure, which requires manual interaction and extremely high quality seismic datasets, tends to be very time consuming.

As noted above, one or more embodiments of the invention provide methods and apparatus to automatically identify possible faults in large seismic datasets, even in the presence of noise.

Figure 1:
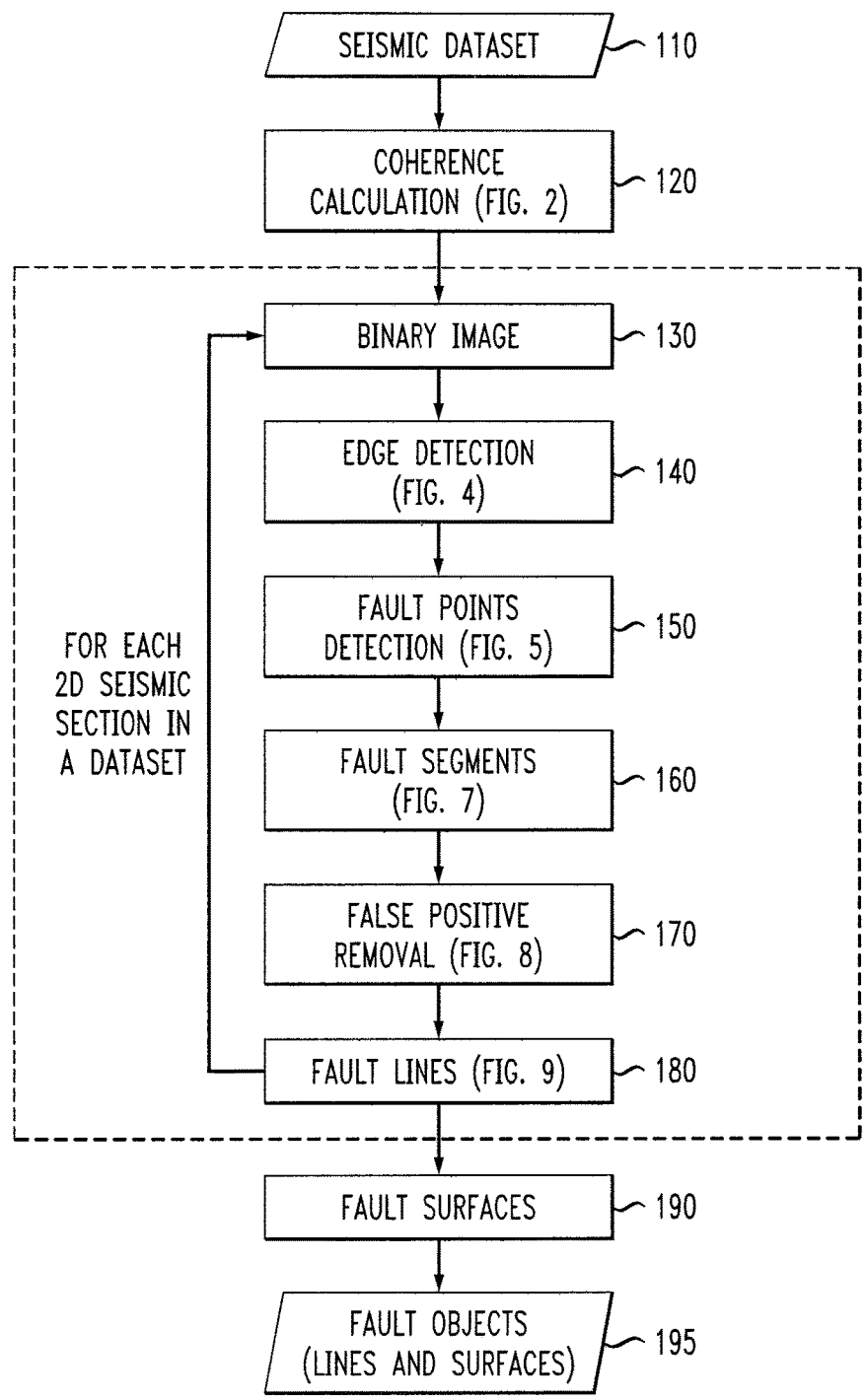
FIG. 1 is a flow chart illustrating an exemplary implementation of an automatic fault detection method, according to one embodiment of the invention.

FIG. 1 is a flow chart illustrating an exemplary implementation of an automatic fault detection method 100 according to one embodiment of the invention. Generally, as shown in FIG. 1, the exemplary automatic fault detection method 100 receives a three-dimensional post-stack seismic dataset 110 as input and produces fault candidate objects (e.g., lines and surfaces) 195 with an associated fault confidence as output. As shown in FIG. 1, a coherence calculation is applied to the three-dimensional seismic dataset 110 during step 120, as discussed further below in conjunction with FIG. 2. Generally, the coherence calculation produces a coherence cube of the seismic data 110. The three-dimensional coherence cube is partitioned into two-dimensional seismic sections. Steps 130-180 are iteratively performed for each two-dimensional seismic section of the coherence cube.

During step 130, a binary representation for each two-dimensional seismic section of the coherence cube is computed, as discussed further below in a section entitled "Binary Image." The edges of continuity areas are outlined during step 140 from the binary image representation obtained from step 130, as discussed further below in conjunction with FIG. 4, to identify changes in the continuity areas as edge points of the binary image representation.

Fault points are then detected and highlighted during step 150 in the three-dimensional seismic data 110 from the edge points obtained from step 140, as discussed further below in conjunction with FIG. 5, and assigned a fault confidence value indicating a likelihood that a given point is part of a fault. Fault segments are then created from the identified fault points during step 160, as discussed further below in conjunction with FIG. 7.

False positives are often obtained with the fault segments created in step 160. Thus, the false positives are removed during step 170, using one or more rules, as discussed further below in conjunction with FIG. 8.

The resulting fault segments are analyzed and then connected successively into at least one fault line during step 180, using geological and/or geometrical constraints, as discussed further below in conjunction with FIG. 9.

Finally, the fault lines in neighboring two-dimensional seismic sections are joined during step 190 to construct three-dimensional fault surfaces, as discussed further below in a section entitled "Fault Surfaces." As a result, seismic cubes are generated having a fault confidence value related to different fault objects (e.g., fault points, fault lines and fault surfaces).

Coherence Calculation

In the seismic context, seismic coherence is a measure of lateral changes in seismic events. When there is sufficient lateral change in acoustic impedance, the three-dimensional seismic coherence cube can be extremely effective in delineating seismic faults. See, e.g., M. S. Bahorich and S. L. Farmer, "3D Seismic Discontinuity for Faults and Stratigraphic Features: The Coherence Cube," *Lead. Edge,* 1053-1058, (October 1995), incorporated by reference herein in its entirety. This seismic coherence attribute is usually computed by means of three different algorithms, as described, for example, in K. Marfurt et al., "Coherency Calculations in the Presence of Structural Dip," *Geophysics,* Vol. 64, No. 1, 104-111 (1999), incorporated by reference herein in its entirety. The first algorithm calculates a cross-correlation between the traces in a given window, (c1), the second algorithm calculates a semblance, (c2), and the third algorithm calculates eigenvalues of the covariance matrix, (c3).

Figure 2:
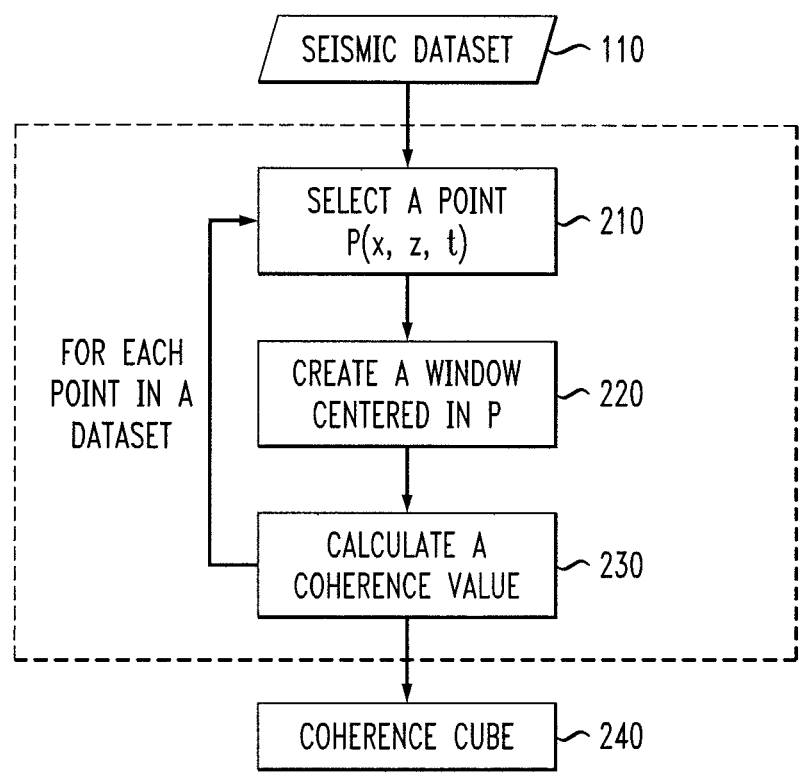
FIG. 2 is a flow chart illustrating an exemplary implementation of a coherence cube generation process.

FIG. 2 is a flow chart illustrating an exemplary implementation of a coherence cube generation process 200. The three algorithms used to compute the coherence cube follow the principles shown in FIG. 2. Generally, for each point in the dataset, a value is computed that measures the similarity between one point and their neighborhood window with $w_x \times W_y \times W_t$ dimensions. $W_x$ represents the number of inline traces, $W_y$ represents the number of crossline traces and $W_t$ represents the number of samples for each trace.

As shown in FIG. 2, the point P is initially selected from the seismic dataset 110 during step 210. The window is then centered around the selected point P during step 220, and the coherence value is computed during step 230 that measures the similarity between the point P and its neighborhood window. Steps 210-230 are repeated for each point in the seismic dataset 110. As a result, a coherence cube 240 is obtained of the entire dataset.

Aspects of the present invention recognize that the three algorithms that calculate the coherence cube 240 are individually computationally intensive, as for each point in the seismic cube the coherence has to be calculated considering a given neighborhood window. However, the calculus for each point is independent of the calculus of the other points in the same dataset. Therefore, the calculation can be tackled with an embarrassingly parallel approach.

Figures 3, 4:
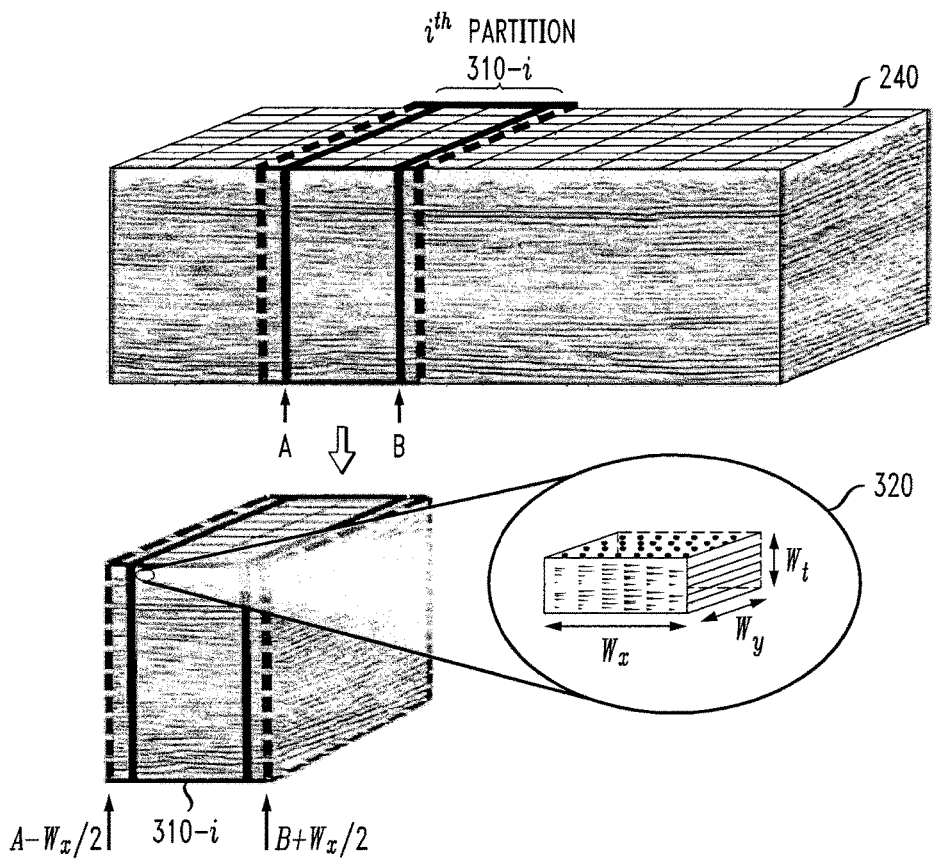
FIG. 3 illustrates a data replication technique for the parallelization of the coherence calculation of FIG. 2.
FIG. 4 illustrates exemplary pseudo code of an edge detection process, according to one embodiment of the invention.

FIG. 3 illustrates a data replication technique for the parallelization of the coherence calculation of FIG. 2. As shown in FIG. 3, a coherence cube 240 for a seismic dataset 110 is divided into n partitions. Each partition, such as an exemplary partition 310-*i*, contains the traces between a trace A and a trace B. However, in the borders of the partition 310-*i*, the computation of the coherence value needs the data from traces that would appear either before trace A or after trace B. In order to prevent data movement between computing nodes, a border of size $W_x/2$ can be replicated for each partition 310-*i*. Thus, as discussed further below in conjunction with FIG. 10, each computing node stores a partition 310-*i* of the dataset between trace (A−$W_x$/2) and (B+$W_x$/2) but restricts the coherence values computation only to the points between trace A and trace B. For the first and the last partitions, only one side of the border needs to be replicated. Cube 320 represents a window W around a specific point where the coherence is calculated.

Binary Image

As noted above, during step 130 of the automatic fault detection method 100, a binary representation for each two-dimensional seismic section of the coherence cube is computed. In order to highlight the horizons, a threshold $T_0$ is applied to the coherence cube 240 to obtain the binary image.

$$H(x, z) = \begin{cases} 1 \text{ if } C(x, z) \geq T_0 \\ 0 \end{cases},$$

where C(x,z) represents the coherence value calculated in a previous step and H(x,z) is a binary image that highlights the horizons (regions of high continuity).

The value of the threshold could be obtained using three different approaches. In a first approach, the interpreter can set the desired value. In a second approach, a default value is defined based on previous experience. In a third approach, an algorithm is used to estimate the best threshold value, depending on the data profile of the dataset. The exemplary embodiments described herein employ the third approach, as it enables automation process.

To estimate the threshold $T_0$, an iterative approach is employed in at least one embodiment, with the following steps:
1. Estimate an initial value for the threshold T. A good initial value is the average intensity of the image.
2. Partition the image into two groups, R1 and R2, using the threshold T.
3. Calculate the mean values $\mu_1$ and $\mu_2$ of the partitions, R1 and R2.
4. Select a new threshold:

$$T = \frac{1}{2}(\mu_1 + \mu_2)$$

Steps 2-4 are repeated until the mean values $\mu_1$ and $\mu_2$ in successive iterations do not change. As a result of this step, the desired binary image is obtained.

Calculation of the binary image is an embarrassingly parallel task since the threshold is known. If the automatic procedure is used to calculate the threshold, steps 2-4 of each iteration can also be executed in a massively parallel fashion. In step (2) partitions can be calculated in each node. In step (3), mean overall values $\mu_1$ and $\mu_2$ can be computed in a straight forward way since partial values for each node can be independently computed and then aggregated.

Edge Detection

Using the binary image H(x,z), the next step identifies the borders where a change in the continuity occurs. As noted above, the edges of continuity areas are outlined during step 140 of the automatic fault detection method 100 from the binary image representation obtained from step 130, to identify changes in the continuity areas as edge points.

FIG. 4 illustrates exemplary pseudo code 400 of an edge detection process according to one embodiment of the invention. Generally, the exemplary pseudo code 400 traverses the dataset in the horizontal direction looking for places where changes in the continuity occurs (e.g., from 0 to 1, or 1 to 0). Points detected therein are highlighted as edge points.

Following execution of the exemplary pseudo code 400, a cube D(x,z) with the edges of the binary image H(x,z) is generated.

Computation of the edges can also optionally be executed in a massively parallel fashion as values stored in one node have all of the information that is necessary to detect whether a point is an edge. In order to do that, data of H(x,z) from the borders have to be replicated, as discussed above in conjunction with FIG. 3 for the coherence calculation.

Fault Points Detection

As noted above, fault points are detected and highlighted during step 150 of the automatic fault detection method 100 and assigned a fault confidence value indicating a likelihood that a given point is part of a fault.

Figure 5:
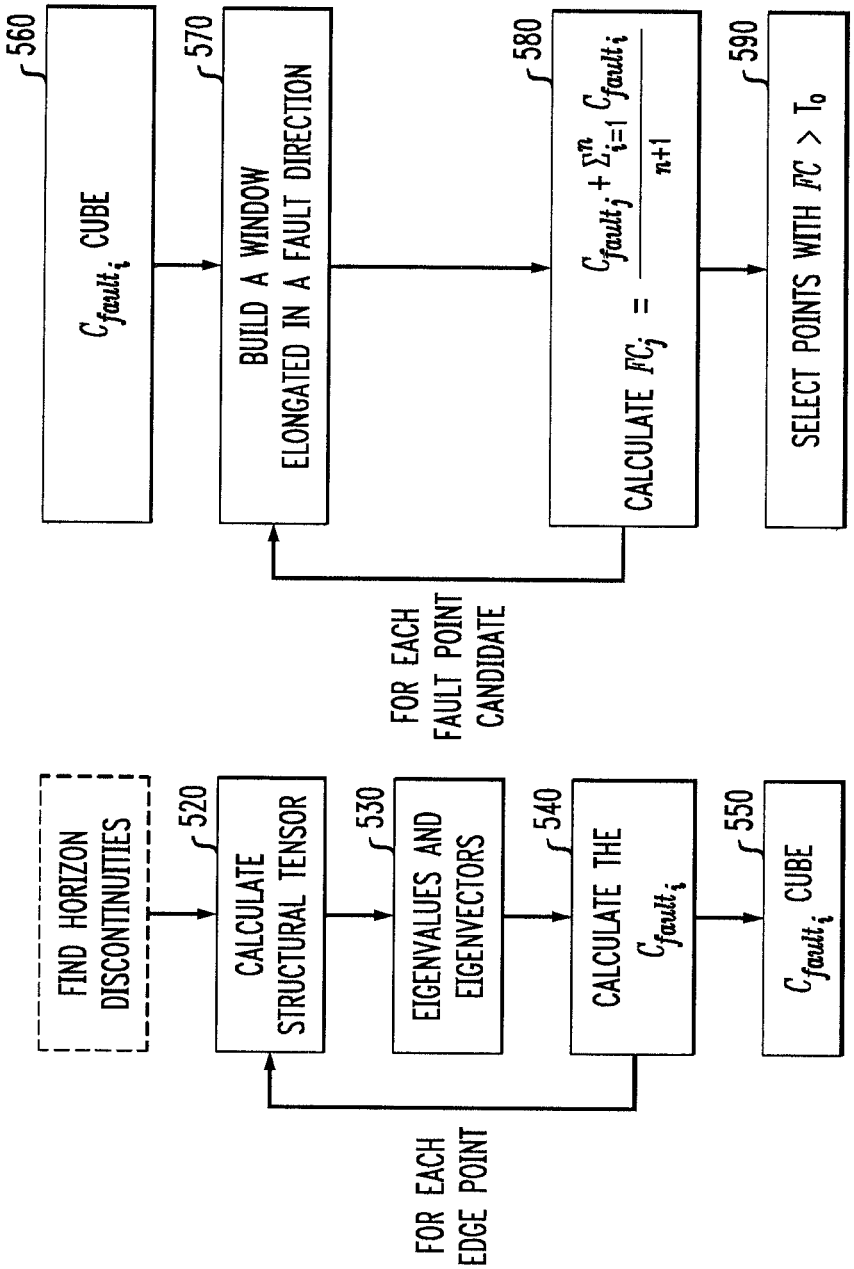
FIG. 5 is a flow chart illustrating an exemplary implementation of a fault point detection process, according to one embodiment of the invention.

FIG. 5 is a flow chart illustrating an exemplary implementation of a fault point detection process 500 according to one embodiment of the invention. Generally, the fault point detection process 500 identifies fault points on the seismic dataset 110. A fault confidence value FC is calculated. This value can be interpreted as how much the point resembles a fault point.

As shown in FIG. 5, for each edge point i, obtained from step 140, in the original seismic dataset 110 at the corresponding position, a Gradient Structure Tensor (GST) is calculated during step 520, to obtain the eigenvalues and eigenvectors 530 of the seismic strata. Then, these eigenvalues of the GST matrix are used to calculate the fault point candidates $C_{fault}$ for each given edge point, i, during step 540, as follows:

$$C_{fault} = \frac{2\lambda_2(\lambda_2 - \lambda_3)}{(\lambda_1 + \lambda_2)(\lambda_2 + \lambda_3)}$$

where $\lambda_1$, $\lambda_2$ and $\lambda_3$ are the eigenvalues of the GST matrix. $C_{fault}$ for all the edge points obtained from step 140 are then obtained during step 550. The $C_{fault}$ for all the edge points are then applied at step 560 for processing each fault point candidate, j, during steps 570-590.

Figure 6:
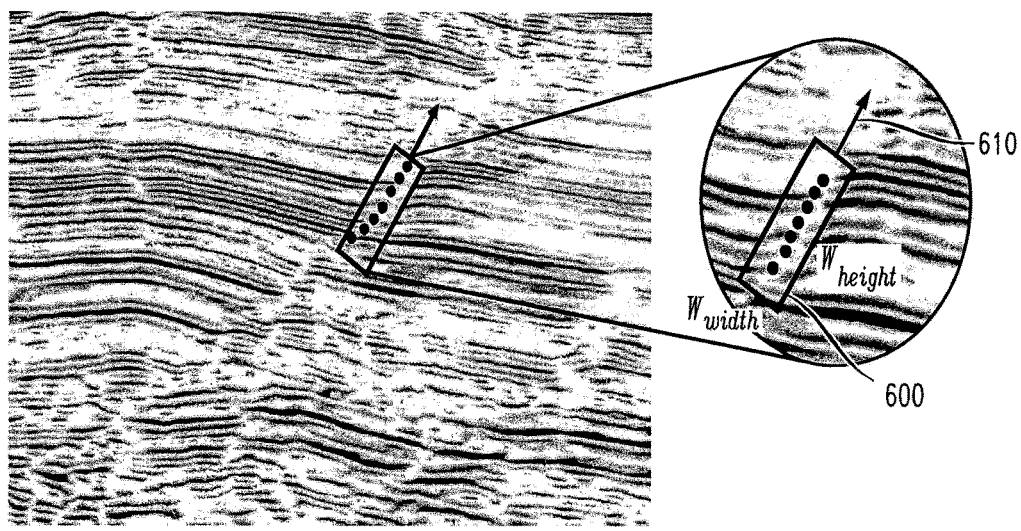
FIG. 6 illustrates an exemplary averaging window used to detect fault points.

As shown in FIG. 5, an averaging window $W_{width} \times W_{height}$ elongated in the fault orientation, as discussed further below in conjunction with FIG. 6, is built during step 570, which will be used to calculate the FC value. Since the dominant eigenvector of the GST defines the gradient direction, which is orthogonal to the seismic horizon, the gradient direction represents a reasonable approximation of the fault orientation. See, e.g., P. Bakker, "Image Structure Analysis for Seismic Interpretation," *Delft Univ. Technol.* (2002). Therefore, for each fault point candidate, j, the $C_{fault}$ values inside the elongated window are used during step 580 to calculate the average FC value for each fault point candidate, as follows:

$$FC_j = \frac{C_{fault} + \sum_{i=1}^{n} C_{fault_i}}{n+1}$$

where n is the number of $C_{fault}$ values inside of the elongated window. A threshold is applied during step 590 to filter the edge points with the highest FC values in order to select the fault points.

FIG. 6 illustrates an exemplary averaging window 600 elongated approximately in the fault direction. The averaging window 600 has a width $W_{width}$ and a height $W_{height}$. The vector 610 represents the orientation of the dominant eigenvector. The center point in the window 600 is a point currently being analyzed (where the window 600 is centered) and the three additional points adjacent the center point are fault point candidates inside the window 600.

The fault point detection process 500 creates a new seismic attribute, which represents the fault confidence. The fault confidence attribute represents the likelihood that the given point can be part of a fault, taking into account the neighborhood of the given point.

In one or more embodiments, the fault point detection process 500 contributes to the performance of the overall automatic fault detection method 100. While existing fault detection methods may use the GST cube, the computation of the GST in three-dimensional requires nine convolutions, three for the gradient and six for the tensor smoothing. Since the tensor is symmetric, only N(N+1)/2 components have to be processed, where N is the dimensionality of the image. Therefore, this calculation is computationally intensive.

The exemplary fault point detection process 500, however, computes the GST only for the possible fault points obtained from step 140. Thus, the amount of calculations to be performed is reduced and the performance of the overall automatic fault detection method 100 is improved.

Computation of GST, $C_{fault}$ and FC for the edges are locally executed considering points within specific windows. If datasets 110 corresponding to the cubes are partitioned according to their three-dimensional positions and replication of borders occur accordingly (as discussed above in conjunction with FIG. 3 for the coherence cube calculation), the calculation of the fault point candidates and the fault confidence attribute can be executed in a massively parallel fashion.

Fault Segments

As noted above, fault segments are created from the identified "most probable" fault points during step 160 of the automatic fault detection method 100. The fault segmentation step connects these sparser fault points into fault segments and eventually in fault lines.

In a first approach, a Hough transform is used to detect lines (segments) inside the binary image of the fault points. See, e.g., Z. Wang and G. AlRegib, "Fault Detection in Seismic Datasets Using Hough Transform," *Acoust. Speech Signal Process.*, 2372-2376 (2014). In a second approach, an Ant Colony approach is employed that could better approximate the real geometry of the fault. See, e.g., J. Zhao and S. Z. Sun, "Automatic Fault Extraction Using a Modified Ant-Colony Algorithm," *J. Geophys. Eng.*, Vol. 10, No. 2, 025009 (Apr. 2013).

One advantage of using the Hough transform is that the method may be faster. Conversely, the Ant Colony method could better approximate the real geometry of the fault, but it is computationally intensive. By taking into account the level of accuracy needed as a parameter, one method can be selected over the other.

Regardless of the method used, a threshold is specified related to the Euclidean distance between points, due to the fact that some points in a dataset could belong geometrically to the same segment but not from a geological point of view. To estimate this threshold, an algorithm is used to determine the best number of clusters in a dataset and estimate the diameter of the most dispersed one. This diameter can be used as a threshold for the Euclidean distance.

Figure 7:
FIG. 7 illustrates two-dimensional images with fault segment candidates for a high quality dataset and a noisy dataset.

In order to improve performance, massively parallelization can be employed of both alternative methods, as they work locally on datasets distributed according to the three-dimensional position of the points. FIG. 7 illustrates two-dimensional images 710, 720 with fault segment candidates from step 160 for the high quality dataset and low quality noisy dataset.

False Positive Removal

As noted above, false positives are often obtained with the fault segments created in step 160 of the automatic fault detection method 100. Thus, false positives are optionally removed during step 170, using one or more predefined rules.

Figure 8:
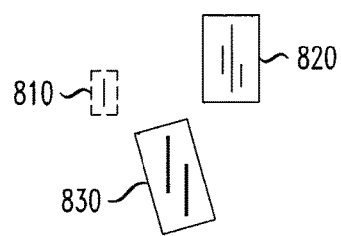
FIG. 8 illustrates geological constraints being used to remove false positive fault segment candidates.

FIG. 8 illustrates geological constraints, for example, being used to remove false positives. For example, isolated segments, such as segment 810, are outliers and could be removed.

Also, neighboring groups where segments are very close to each other, such as segments in regions 820 and 830, are geologically impossible. One method to deal with segments that are very close to each other is to combine them into a single segment. Segments in regions 820 and 830 can be combined into one single segment. For example, segments inside region 830 represent the left and right side of a fault; those segments could be combined into one single segment by making an alignment using a Dynamic Time Warping (DTW) algorithm. See, e.g., D. Hale, "Methods to Compute Fault Images, Extract Fault Surfaces, and Estimate Fault Throws From 3D Seismic Images," Geophysics, Vol. 78, No. 2 (2013).

The identification of the false features depends on a function of the spatial relationship between the segments, such as, for example, an absolute distance (AD) function and a lateral distance (LD) function. See, e.g., Z. Wang and G. AlRegib, "Fault Detection in Seismic Datasets Using Hough Transform," *Acoust. Speech Signal Process.*, 2372-2376 (2014).

In one or more embodiments, the removal of outliers and grouping of segments are massively parallelized as they work locally on datasets distributed according to the three-dimensional position of the segment lines.

Fault Lines

As noted above, the resulting fault segments are analyzed and then connected successively into at least one fault line during step 180 of the automatic fault detection method 100, using geological and/or geometrical constraints.

Figure 9:
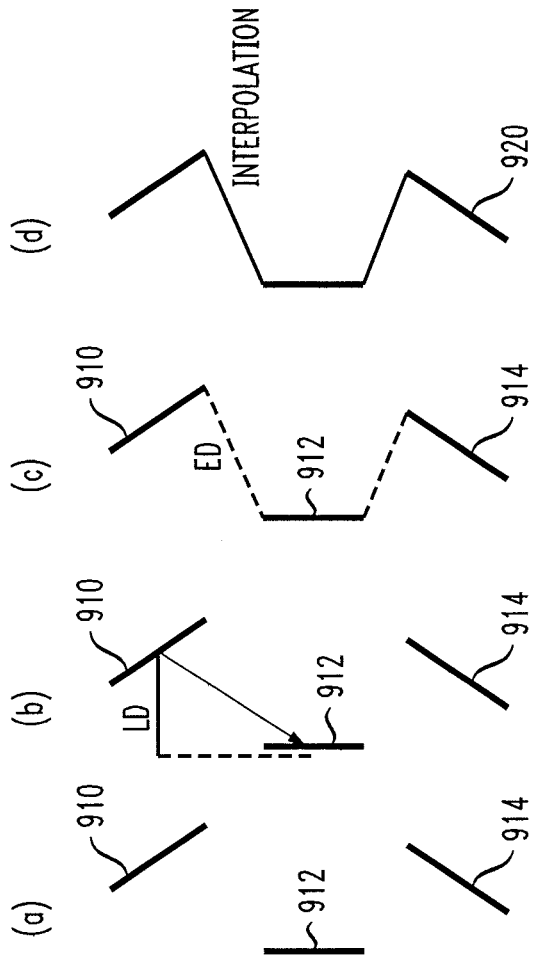
FIG. 9 illustrates an exemplary fault line building process.

FIG. 9 illustrates an exemplary fault line building process 900. As shown in FIG. 9, at a time (a), there are three distinct segments 910, 912, 914. At a time (b), a lateral distance (LD) calculation is performed between segments 910 and 912, for example. At a time (c), a Euclidean distance between is obtained the two neighboring segments 910 and 912, for example. Finally, at a time (d), an interpolation is performed to connect the three distinct segments 910, 912, 914 into one fault line 920.

Generally, two segments can be joined into the same fault line if they are approximately in substantially the same vertical position and are geometrically close. In order to detect if two segments happen to be vertically close to each other, the lateral distance calculation is employed at time (b). Defining whether two segments are geometrically close requires estimating the minimum Euclidean distance between those segments, at time (c). Whenever two segments meet both constraints, an interpolation is applied at time (d) between the two closest points of those segments to build a line. The same process is repeated until all segments meeting those constraints have been joined.

In one or more embodiments, the connection of fault segments into at least one fault line is massively parallelized, to the locality of the process.

Fault Surfaces

As noted above, the fault lines in neighboring two-dimensional seismic sections are joined during step 190 of the automatic fault detection method 100 to construct three-dimensional fault surfaces. As a result, seismic cubes are generated having a fault confidence value related to different fault objects (e.g., fault points, fault lines and fault surfaces).

In order to join the fault lines in neighboring two-dimensional seismic sections to construct the three-dimensional fault surfaces, all the fault lines in every two-dimensional seismic section are processed to find the continuity of those lines in other fault lines in neighboring sections. One or more embodiments employ a Dynamic Time Warping (DTW) algorithm. See, for example, D. Berndt and J. Clifford, "Using Dynamic Time Warping to Find Patterns in Time Series," *AAAI94 Workshop on Knowledge Discovery in Databases*, 359-370 (1994). DTW is a technique for comparing two waveform representations despite a variation in scale and timing. Therefore, DTW is applied to measure the similarity between two fault lines. The general idea of this approach is to find the continuity of any fault lines through its neighboring sections.

In one or more embodiments, massive parallel execution of DTW can be executed in each compute node to detect groups of lines that correspond to a three-dimensional surface that corresponds to a fault.

Parallelization of the Automatic Fault Detection Steps

As noted above, in one or more embodiments, one or more steps of the exemplary automatic fault detection method 100 are massively parallelized as they work locally on datasets distributed according to the three-dimensional position of the points, segments, and lines.

Figure 10:
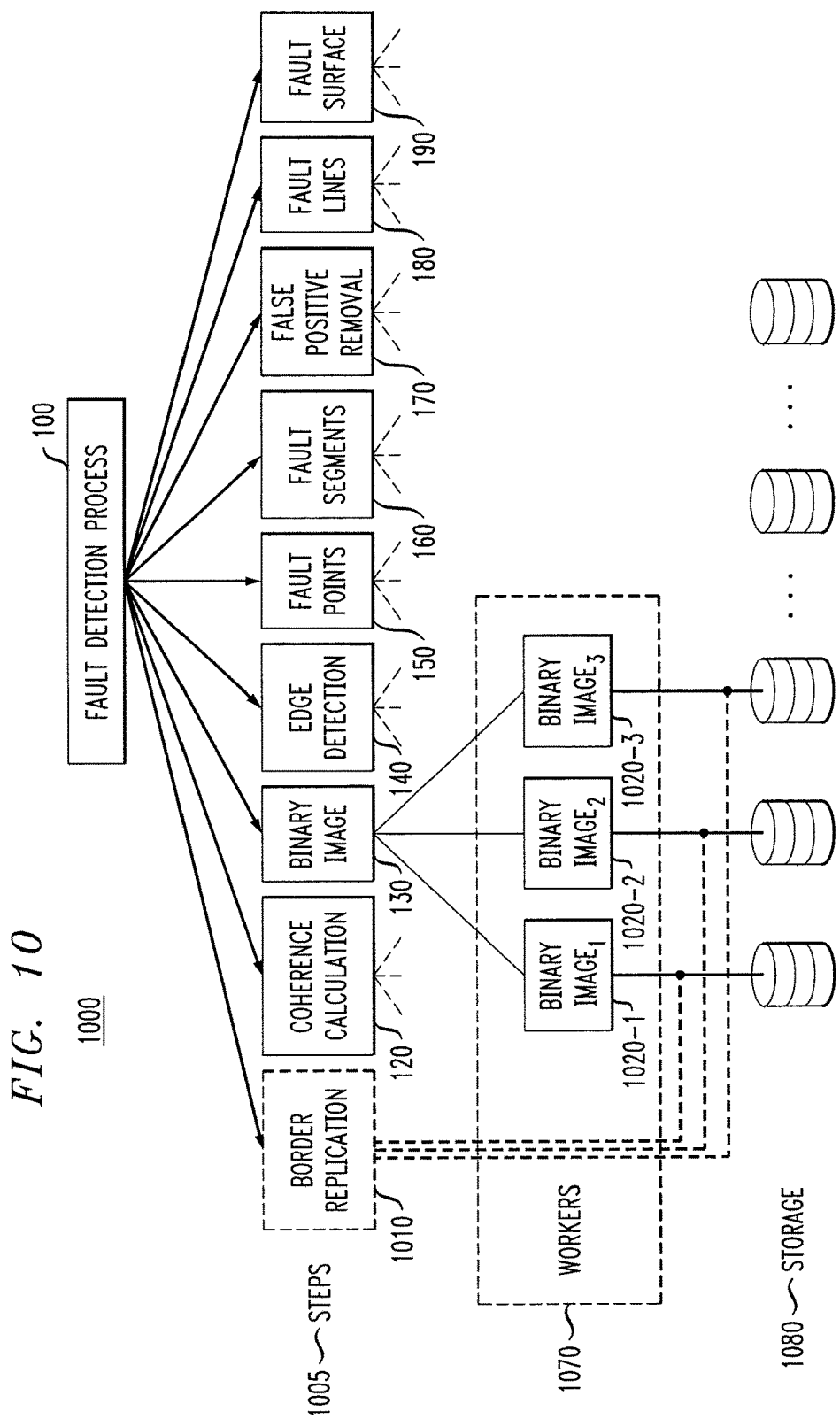
FIG. 10 illustrates an exemplary parallel architecture for identification of faults over an exemplary seismic dataset in accordance with aspects of the invention.

FIG. 10 illustrates an exemplary architecture 1000 for parallel detection of faults over an exemplary seismic dataset 110 in accordance with aspects of the invention. As shown in FIG. 10, a parallel implementation of the automatic fault detection method 100 can be comprised of steps 1005, including the individual steps 120, 130, 140, 150, 160, 170, 180, 190 of the automatic fault detection method 100, plus a border replication step 1010, discussed above in conjunction with FIG. 3.

A plurality of instances of at least one step 1005 are executed as workers 1070 in parallel, in the manner described above with respect to each individual step, to generate a partial solution for a corresponding portion of the binary image created in step 130, such as binary image portions 1020-1 through 1020-3. The results for each portion 1020 of the binary image are stored in corresponding storage nodes of a storage system 1080.

Fault detection is computationally intensive and time consuming. The exemplary architecture 1000 of FIG. 10 parallelizes all the steps of the automatic fault detection method 100.

Initially, the coherence cube is computed in parallel reducing the time consumed by the overall automatic fault detection method 100. In steps 130 and 140, horizons are highlighted and the horizon discontinuities are identified throughout the partitions 310 of the dataset, assuming that partitions are created based on the three-dimensional positions and data replication of borders is executed accordingly, as discussed above in conjunction with FIG. 3. Those tasks could be performed in parallel as the technique is applied on each partition independently of the remaining partitions 310 of the cube 240.

During step 150, fault points are detected using GST and assigned a fault confidence value indicating a likelihood that a given point is part of a fault. GST is known to be computationally intensive, but with the exemplary architecture 1000 of FIG. 10, assuming that partitions are created based on the three-dimensional positions and data replication of borders is executed accordingly, as discussed above in conjunction with FIG. 3. This step can be performed in a massively parallel fashion. Unlike those reported in literature, the calculation of the entire GST cube is not necessary. We only need to calculate the GST in the possible fault points, reducing the computational cost of the algorithm again.

During steps 160, 170, fault segments are identified and false positive are removed independently for each partition 310, in parallel. Finally, steps 180 and 190 to connect segments to generate lines and lines to generate three-dimensional surfaces can be executed in parallel.

Confidence Values for Different Fault Objects

As noted above, during the automatic fault detection method 100, three different fault object types are identified: fault points, fault lines and fault surfaces. Assigning a confidence value for each detected object could guide interpreters towards some important regions inside the dataset. In step 150, an algorithm to assign a confidence value to fault points is described.

Fault lines refer to sets of segments. For this reason, assigning a confidence value to a fault line requires associating a confidence value to a segment in the first place. Segments are sets of fault points. One approach to associate a confidence value to a segment is simply to calculate an average of the confidence value of all the points in that segments, as follows:

$$Sg_{fault} = \frac{\sum_{i=1}^{n} FC_i}{n}$$

Where:

n: Number of fault points in a segment.

Now, to associate a confidence value to a fault line certain criteria must be jointly taken into account:

1. Number of segments in a line;
2. Average of the truth value of those segments;
3. Average of the lateral and euclidean distance between those segments.

The general idea is that a fault line including many segments, with highest average among the confidence values of those segments and with lowest average of the euclidean and lateral distance, is a potential fault line and a high confidence value should be assigned to it.

$$L_{fault} = \frac{\sum_{i=1}^{n} Sg_{fault_i}}{n} - \frac{\sum_{i=1}^{n} ED(Sg_{fault_i}, Sg_{fault_{i+1}}) + LD(Sg_{fault_i}, Sg_{fault_{i+1}})}{n-1}$$

where:

n: Number of segments in a fault line;
ED: Euclidean distance;
LD: Lateral distance; and
$Sg_{fault_i}$: confidence value associate to a segment i.

At the end of this process, the confidence values of the fault lines can be normalized to create a ranking and associate a probability value related to the other fault lines in the same two-dimensional seismic section.

$$L_{fault\ probability_i} = \frac{L_{fault_i}}{\sum_{i=1}^{n} L_{fault_i}}$$

In this case, n represents a number of fault lines in a two-dimensional seismic section.

A fault surface is built connecting fault lines in neighboring two-dimensional seismic sections. The process aims to find matches between a line in one section and lines in neighboring sections using DTW.

Then, in order to define a confidence value associated to a fault surface, the following must be considered:

1. Number of lines in a surface;
2. An average of the confidence values of those lines; and
3. An average of the DTW distance between all the lines in a surface.

$$S_{fault} = \frac{\sum_{i=1}^{n} L_{fault_i}}{n} + \frac{\sum_{i=1}^{n-1} DTW(L_{fault_i}, L_{fault_{i+1}})}{n-1}$$

Again, the confidence values of the fault surfaces can be normalized to create a ranking.

Examples

Fault Identification on Noisy Seismic Data

In some cases, faults seal the porous reservoir rock and lead to the formation of hydrocarbons reservoirs. Therefore, the identification of faults is very important to recognize potential regions where hydrocarbons can be found. Frequently, the interpreter has to identify faults on low quality seismic datasets in order to evaluate the potential of a given area. For instance areas with complex geologies, like the one we can find in the pre-salt area, present a very low ratio between signal and noise. In this scenario, commonly automatic or semi-automatic fault identification techniques perform poorly.

The disclosed methods allows the interpreter to identify seismic faults regardless of the quality of the seismic data. The interpreter can execute the method on a low quality seismic dataset. The method output is a list of fault candidates associated with their confidence values found on the seismic dataset. The interpreter may then focus the attention on the most relevant fault candidates in order to identify the potential regions where hydrocarbons can be found.

Ranking Fault Candidates

When the interpreter has to work on large datasets, it is highly important to rank the potential faults, so that the interpreter can focus the attention on the most relevant regions of the dataset. Once the disclosed method has been executed on a seismic dataset, the result of the execution is a list of fault candidates ordered by their associated confidence value found by the method, which indicates the areas where the interpreter should focus the attention. In addition, some faults tend to be more important than others, therefore the method assigns a confidence value to each fault. This value can help the interpreter to define a threshold to decide which faults are worthwhile to analyze.

Automatic Fault Identification in Large Seismic Datasets

The disclosed method allows the interpreter to perform fault identification in large seismic datasets, several terabytes in size, in a reasonable timeframe. The method finds automatically the best combination of parameters and scales the process using parallel processing strategies. Generally, the fault identification process would be much slower and not trivial if performed manually by visual analysis.

CONCLUSION

Seismic interpretation corresponds to the crucial phase of the Oil and Gas upstream cycle in which the earth subsurface is analyzed in order to identify areas that potentially contain hydrocarbon reserves. Identification of horizons and faults is an important part of this process. Since the size of seismic datasets 110 is getting larger and larger, and their interpretation is a time consuming process, finding ways to efficiently automate the massive identification of these features can help to speed up the process by orders of magnitude. In addition, the efficiency of the process is typically influenced by level of noise present in the data. The more robust an automatic process is regarding the noise, the more useful it is for the seismic interpreter. Methods and apparatus are provided to massively explore seismic noisy datasets in order to automatically identify faults. The disclosed methods are comprised of individual steps one or more of which can be executed by means of embarrassingly parallel algorithms.

Moreover, other forms and advantages of the invention will in part be obvious and will in part be apparent from the specification and drawings. It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary distributed computing environment 1000. Such components can communicate with other elements of the exemplary distributed computing environment 1000 over any type of network or other communication media.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 11:
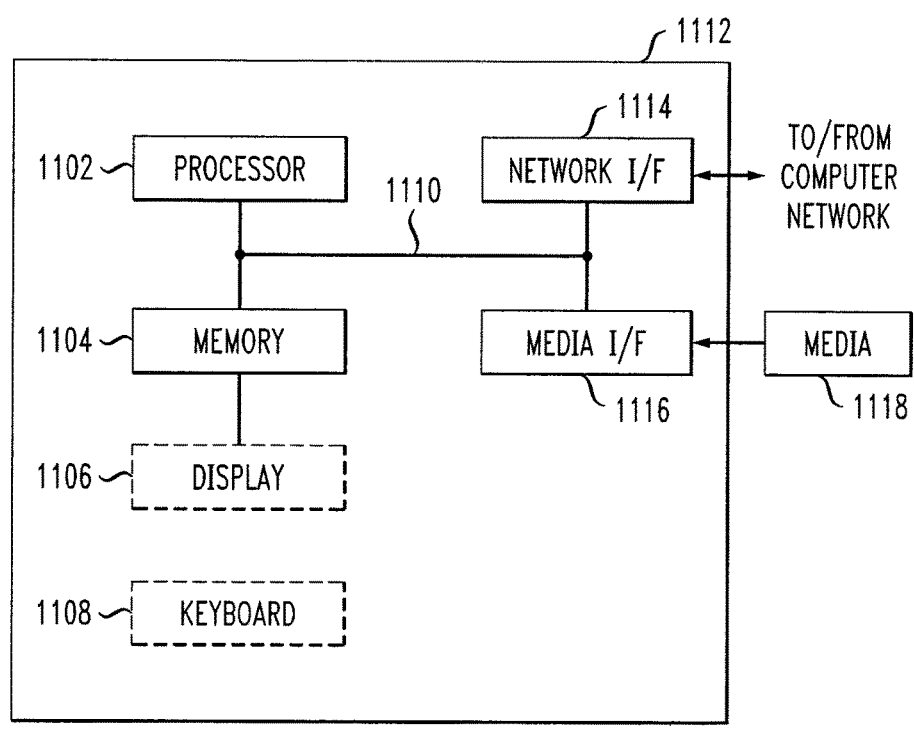
FIG. 11 is a system diagram of an exemplary computer system on which at least one embodiment of the invention can be implemented.

By way of example, an aspect of the present invention can make use of software running on a general purpose computer. FIG. 11 is a system diagram of an exemplary computer system on which at least one embodiment of the invention can be implemented. As depicted in FIG. 11, an example implementation employs, for example, a processor 1102, a memory 1104, and an input/output interface formed, for example, by a display 1106 and a keyboard 1108. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 1102, memory 1104, and input/output interface such as display 1106 and keyboard 1108 can be interconnected, for example, via bus 1110 as part of a data processing unit 1112. Suitable interconnections via bus 1110, can also be provided to a network interface 1114 (such as a network card), which can be provided to interface with a computer network, and to a media interface 1116 (such as a diskette or compact disc read-only memory (CD-ROM) drive), which can be provided to interface with media 1118.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 1108, displays 1106, and pointing devices, can be coupled to the system either directly (such as via bus 1110) or through intervening I/O controllers.

Network adapters such as network interface 1114 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 1112 as depicted in FIG. 11) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for identifying faults in seismic data, comprising the steps of:
   obtaining said seismic data;
   calculating a coherence cube of said seismic data;
   performing the following steps, using at least one processing device, for a plurality of two-dimensional seismic sections of the coherence cube:
   (i) applying a threshold to the coherence cube to obtain a binary image representation comprising one or more continuities;
   (ii) identifying edges of continuity areas in the binary image representation to identify changes in said one or more continuities as fault point candidates;
   (iii) identifying fault points in the obtained seismic data based on a fault confidence value above a specific threshold, indicating a likelihood that a given point is part of a fault;
   (iv) creating one or more fault segments from the identified fault points; and
   (v) joining one or more fault segments into one or more fault lines using one or more of geological and geometrical constraints; and
   generating, using the at least one processing device, one or more three-dimensional fault surfaces from said one or more fault lines in said plurality of two-dimensional seismic sections.

2. The method of claim 1, wherein the fault candidates are associated with said fault confidence value.

3. The method of claim 1, wherein the step of calculating said coherence cube further comprises the steps of computing, for each point in a seismic dataset, a value measuring similarity between one point and a neighborhood window of said one point by partitioning said seismic dataset into a plurality of partitions; replicating a border for each partition to ensure that neighborhood window for each point in each partition is available; assigning each partition to a different compute node in a distributed computing system; and processing the partitions in parallel.

4. The method of claim 1, wherein the threshold applied to the coherence cube in order to obtain the binary image representation is determined using an iterative process and wherein said seismic data is partitioned into a plurality of partitions and wherein each partition is assigned to a different compute node in a distributed computing system so that the computation regarding the data of each partition occurs in parallel.

5. The method of claim 1, wherein the applying step further comprises distributing multiple partitions of the coherence cube and applying the threshold independently and in parallel to the multiple partitions.

6. The method of claim 1, wherein the step of identifying edges of continuity areas further comprises the steps of partitioning said binary image into a plurality of partitions; replicating at least a portion of a border for each partition; assigning each partition to a different compute node in a distributed computing system; and processing each partition in parallel.

7. The method of claim 1, wherein, for each edge point at a corresponding position of the obtained seismic data, the step of identifying fault points further comprises the steps of calculating a Gradient Structure Tensor (GST) to obtain one or more eigenvalues and an orientation of a seismic strata; calculating a fault point candidate metric for each point using the eigenvalues; calculating the fault confidence value using an averaging window elongated in a fault direction; and selecting one or more points with fault confidence values above a specific given threshold.

8. The method of claim 1, wherein the step of identifying fault points further comprises the steps of partitioning said seismic data into a plurality of partitions; replicating at least a portion of a border for each partition; assigning each partition to a different compute node in a distributed computing system to compute the fault confidence value; and processing each partition in parallel.

9. The method of claim 1, wherein the step of creating one or more fault segments comprises the application of Hough transform or Ant Colony techniques and applying a threshold to the Euclidean distance between the fault points.

10. The method of claim 9 wherein said threshold for the Euclidean distance between the fault points is based on determining a number of clusters in the seismic data and estimating a diameter of a most dispersed cluster.

11. The method of claim 1, wherein one or more of the steps of (a) creating one or more fault segments from the identified fault points; (b) removing zero or more false features; and (c) joining one or more fault segments into one or more fault lines further comprise the steps of partitioning said seismic data into a plurality of partitions, replicating borders of the partitions; assigning each partition to a different compute node in a distributed computing system; and processing the steps in parallel for each partition.

12. The method of claim 1, further comprising one or more of assigning a confidence value to a given fault segment based on the fault confidence value of the fault points in the given fault segment; assigning a confidence value to a given fault line based on the confidence values of the fault segments in the given fault line; and assigning a confidence value to a given three-dimensional fault surface based on the confidence values of the fault lines in the given fault three-dimensional fault surface.

13. The method of claim 1, further comprising the step of removing one or more false features associated with the one or more fault segments using one or more rules.

14. A computer program product for identifying faults in seismic data, comprising a non-transitory machine-readable storage medium having encoded therein executable code of one or more software programs, wherein the one or more software programs when executed by at least one processing device perform the following steps:
   obtaining said seismic data;
   calculating a coherence cube of said seismic data;
   performing the following steps, using the at least one processing device, for a plurality of two-dimensional seismic sections of the coherence cube:
   (i) applying a threshold to the coherence cube to obtain a binary image representation comprising one or more continuities;
   (ii) identifying edges of continuity areas in the binary image representation to identify changes in said one or more continuities as fault point candidates;
   (iii) identifying fault points in the obtained seismic data based on a fault confidence value above a specific threshold, indicating a likelihood that a given point is part of a fault;
   (iv) creating one or more fault segments from the identified fault points; and
   (v) joining one or more fault segments into one or more fault lines using one or more of geological and geometrical constraints; and generating, using the at least one processing device, one or more three-dimensional fault surfaces from said one or more fault lines in said plurality of two-dimensional seismic sections.

15. A system for identifying faults in seismic data, comprising:
a memory; and
at least one processing device, coupled to the memory, operative to implement the following steps:
obtaining said seismic data;
calculating a coherence cube of said seismic data;
performing the following steps, using the at least one processing device, for a plurality of two-dimensional seismic sections of the coherence cube:
(i) applying a threshold to the coherence cube to obtain a binary image representation comprising one or more continuities;
(ii) identifying edges of continuity areas in the binary image representation to identify changes in said one or more continuities as fault point candidates;
(iii) identifying fault points in the obtained seismic data based on a fault confidence value above a specific threshold, indicating a likelihood that a given point is part of a fault;
(iv) creating one or more fault segments from the identified fault points; and
(v) joining one or more fault segments into one or more fault lines using one or more of geological and geometrical constraints; and
generating, using the at least one processing device, one or more three-dimensional fault surfaces from said one or more fault lines in said plurality of two-dimensional seismic sections.

16. The system of claim 15, wherein the step of calculating said coherence cube further comprises the steps of computing, for each point in a seismic dataset, a value measuring similarity between one point and a neighborhood window of said one point by partitioning said seismic dataset into a plurality of partitions; replicating a border for each partition to ensure that neighborhood window for each point in each partition is available; assigning each partition to a different compute node in a distributed computing system; and processing the partitions in parallel.

17. The system of claim 15, wherein the threshold applied to the coherence cube in order to obtain the binary image representation is determined using an iterative process and wherein said seismic data is partitioned into a plurality of partitions and wherein each partition is assigned to a different compute node in a distributed computing system so that the computation regarding the data of each partition occurs in parallel.

18. The system of claim 15, wherein the applying step further comprises distributing multiple partitions of the coherence cube and applying the threshold independently and in parallel to the multiple partitions.

19. The system of claim 15, wherein one or more of the steps of identifying edges of continuity areas; identifying fault points; creating one or more fault segments from the identified fault points; removing zero or more false features; and joining one or more fault segments into one or more fault lines further comprise the steps of partitioning said binary image into a plurality of partitions; replicating at least a portion of a border for each partition; assigning each partition to a different compute node in a distributed computing system; and processing each partition in parallel.

20. The system of claim 15, wherein, for each edge point at a corresponding position of the obtained seismic data, the step of identifying fault points further comprises the steps of calculating a Gradient Structure Tensor (GST) to obtain one or more eigenvalues and an orientation of a seismic strata; calculating a fault point candidate metric for each point using the eigenvalues; calculating the fault confidence value using an averaging window elongated in a fault direction; and selecting one or more points with fault confidence values above a specific given threshold.

21. The system of claim 15, wherein the step of creating one or more fault segments comprises the application of Hough transform or Ant Colony techniques and applying a threshold to the Euclidean distance between the fault points.

22. The system of claim 15, further comprising one or more of assigning a confidence value to a given fault segment based on the fault confidence value of the fault points in the given fault segment; assigning a confidence value to a given fault line based on the confidence values of the fault segments in the given fault line; and assigning a confidence value to a given three-dimensional fault surface based on the confidence values of the fault lines in the given fault three-dimensional fault surface.

* * * * *